(12) United States Patent
Lagunoff et al.

(10) Patent No.: US 10,317,916 B2
(45) Date of Patent: Jun. 11, 2019

(54) HYDRAULIC PUMP ASSEMBLY

(71) Applicant: BorgWarner TorqTransfer Systems AB, Landskrona (SE)

(72) Inventors: Gustaf Lagunoff, Umeå (SE); Axel Wallgren, Lund (SE); Gunnar Jonesand, Eslöv (SE); Bo Lundström, Glumslöv (SE)

(73) Assignee: BorgWarner Sweden AB, Landskrona (SE)

( * ) Notice: Subject to any disclaimer, the term of this patent is extended or adjusted under 35 U.S.C. 154(b) by 391 days.

(21) Appl. No.: 14/780,373

(22) PCT Filed: Feb. 11, 2014

(86) PCT No.: PCT/SE2014/050168
§ 371 (c)(1),
(2) Date: Sep. 25, 2015

(87) PCT Pub. No.: WO2014/158070
PCT Pub. Date: Oct. 2, 2014

(65) Prior Publication Data
US 2016/0048133 A1 Feb. 18, 2016

(30) Foreign Application Priority Data

Mar. 26, 2013 (SE) ..................... 1350384

(51) Int. Cl.
*F04B 1/20* (2006.01)
*G05D 7/01* (2006.01)
(Continued)

(52) U.S. Cl.
CPC ......... *G05D 7/0173* (2013.01); *B60W 10/119* (2013.01); *F03C 1/0644* (2013.01);
(Continued)

(58) Field of Classification Search
CPC ... G05D 7/0173; G05D 7/018; B60W 10/119; F04B 53/16; F04B 39/12
(Continued)

(56) References Cited

U.S. PATENT DOCUMENTS 2,405,600 A 8/1946 Morris
3,730,428 A * 5/1973 Kreuter ..................... F15C 3/00
236/82

(Continued)

FOREIGN PATENT DOCUMENTS

CN 102575666 A 7/2012
JP H04254021 A 9/1992
(Continued)

OTHER PUBLICATIONS

Russian Office Action dated Nov. 16, 2017, Applicant: BorgWarner TorqTransfer Systems AB, Russian Application Serial No. 2015145028 filed Feb. 11, 2014; 7 pages.
(Continued)

*Primary Examiner* — Charles G Freay
*Assistant Examiner* — Thomas Fink
(74) *Attorney, Agent, or Firm* — BrooksGroup

(57) ABSTRACT

A hydraulic pump assembly comprises a rotatable piston drum (20) with at least one centrifugal lever (23) pivotally attached thereto for radial movements between radial flanges (20') under the action of centrifugal force at rotation of the piston drum. The centrifugal lever (23) is arranged to control the position of a valve member, preferably a ball (22), at the opening end of a bore (21) in the piston drum (20). There is a defined friction surface (28; 32) between the lever (23) and one of the radial flanges (20'), and there are spring means (29-31; 25, 33) for resiliently biasing the lever against said one of the flanges.

4 Claims, 4 Drawing Sheets

(51) Int. Cl.
  *B60W 10/119* (2012.01)
  *F04B 1/30* (2006.01)
  *F04B 53/10* (2006.01)
  *F04B 1/34* (2006.01)
  *F03C 1/06* (2006.01)
  *F03C 1/34* (2006.01)
  *F03C 1/40* (2006.01)

(52) U.S. Cl.
  CPC .......... *F03C 1/0655* (2013.01); *F03C 1/0684* (2013.01); *F03C 1/0697* (2013.01); *F04B 1/20* (2013.01); *F04B 1/2014* (2013.01); *F04B 1/2042* (2013.01); *F04B 1/30* (2013.01); *F04B 1/34* (2013.01); *F04B 53/1012* (2013.01)

(58) Field of Classification Search
  USPC ........................................................ 251/297
  See application file for complete search history.

(56) References Cited

U.S. PATENT DOCUMENTS

| | | | | |
|---|---|---|---|---|
| 4,034,625 A | * | 7/1977 | Taintor | B60W 10/02 475/291 |
| 4,549,628 A | * | 10/1985 | Abe | B62D 6/02 180/421 |
| 5,638,866 A | * | 6/1997 | Mueller | F15B 13/0422 137/596 |
| 2005/0217751 A1 | * | 10/2005 | Valentine | B60K 15/04 141/104 |
| 2006/0254268 A1 | * | 11/2006 | Yasuda | F16H 61/40 60/435 |
| 2007/0234999 A1 | * | 10/2007 | Tanaka | F02D 11/02 123/198 DB |
| 2008/0300757 A1 | * | 12/2008 | Kanayama | E02F 9/2025 701/50 |
| 2011/0192695 A1 | | 8/2011 | Lundstrom | |

FOREIGN PATENT DOCUMENTS

| | | |
|---|---|---|
| JP | 2013506601 A | 2/2013 |
| SU | 978644 A1 | 2/1995 |
| WO | 2010019094 A1 | 2/2010 |
| WO | 2011043722 A1 | 4/2011 |
| WO | WO 2011043722 A1 * | 4/2011 ............ F04B 1/2035 |
| WO | 2012125096 A1 | 9/2012 |

OTHER PUBLICATIONS

Chinese Office Action dated Sep. 26, 2016 ; Application No. 201480018545.3; Applicant: BorgWarner TorqTransfer Systems AB.; 6 pages.

Extended European Search Report dated Oct. 11, 2016 ; Application No. 14773544.3-1608/2978969 ; Applicant: BorgWarner TorqTransfer Systems AB;6 pages.

Chinese Office Action dated Mar. 9, 2017 ; Application No. 201480018545.3; Applicant: BorgWarner TorqTransfer Systems AB; 6 pages.

* cited by examiner

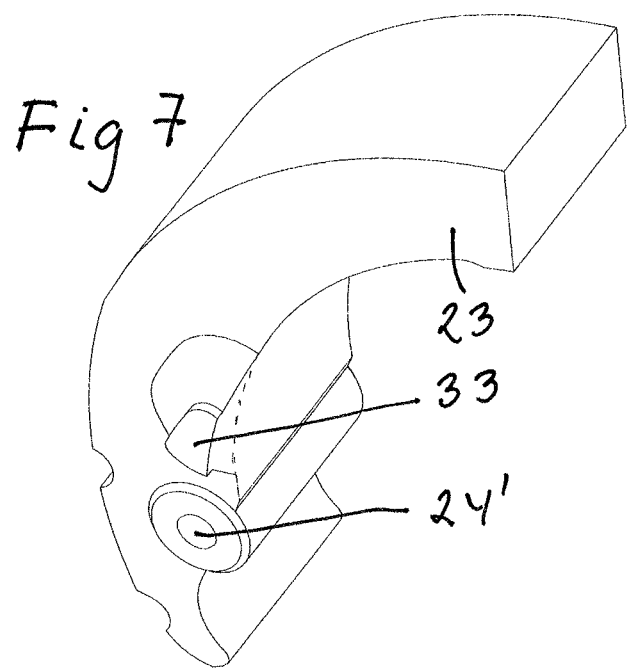

US 10,317,916 B2

HYDRAULIC PUMP ASSEMBLY

This application claims the benefit of Swedish Application No. 1350384-2 filed Mar. 26, 2013 and PCT Application No. SE2014/050168 filed Feb. 11, 2014.

TECHNICAL FIELD

The present invention relates to a hydraulic pump assembly, comprising a rotatable piston drum with at least one centrifugal lever pivotally attached thereto for radial movements between radial flanges under the action of centrifugal force at rotation of the piston drum, the centrifugal lever being arranged to control the position of a valve member, preferably a ball, at the opening end of a bore in the piston drum.

BACKGROUND OF THE INVENTION

Such a hydraulic pump assembly can be used in a system including a wet disc coupling for distributing torque between front and rear axles of an all wheel drive vehicle (AWD) and/or between left and right wheels of a two or four wheel drive vehicle. This hydraulic pump assembly for actuating a wet disc coupling is shown and described in WO 2010/019094 and in a more developed form in WO 2011/043722. For a better understanding of the background of the invention, reference is made to these two publications, especially the latter.

A desirable property of an all wheel drive system and its actuator is high dynamics. Based on vehicle dynamical and traction optimizing desired values, it shall be possible to reach the desired torque as quickly as possible. The accuracy with which this is obtained shall also be as high as possible without creating superimposed disturbances, i.e. overtones of any kind to the fundamental signal.

A pressure regulator and thus torque regulator of the type shown in the above publications has basically a highly dynamic function. There is an inherent risk that it may react in a non-desirable way on process disturbances that are caused by for example external acceleration, vibrations, temperature changes, and rotation speed variations. As a result superimposed torque variations in a non-desired frequency range may occur.

It may thus be desirable to introduce control over the dynamics of the regulator in a defined frequency range in order not to be forced to make a balance between high dynamics and robustness against process disturbances.

THE INVENTION

In a hydraulic pump assembly of the kind described above this may according to the invention be attained by the introduction of a defined friction surface between the lever and one of the radial flanges and by spring means for resiliently biasing the lever against said one of the flanges.

The friction surface is preferably in the form of a knob on an axial side of the lever.

In a first embodiment a compression spring placed in an axial bore in the lever may be arranged to push a ball against the other radial flange.

In the known regulator there is a ring spring arranged around the piston drum and laid over an axial pin on the lever for controlling the radial movement of the lever. In a second embodiment of the invention the axial pin has a surface sloping downwards from the lever towards the piston drum.

BRIEF DESCRIPTION OF THE DRAWINGS

The invention will be described in further detail below under reference to the accompanying drawings, in which FIG. 7 is an isometric view of an exemplary lever to be used in the second embodiment according to FIG. 5.

DETAILED DESCRIPTION OF EMBODIMENTS

Figure 1:
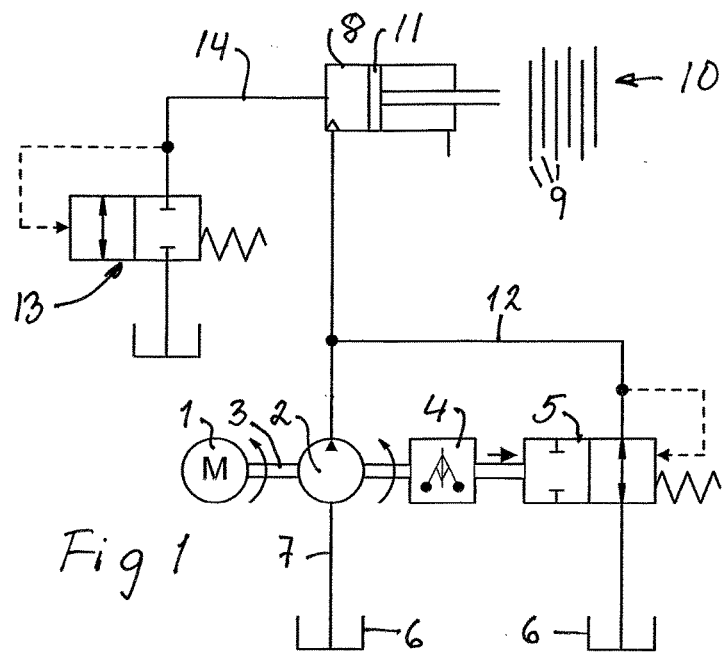
FIG. 1 is a hydraulic scheme for an AWD coupling in a road vehicle.
Figure 2:
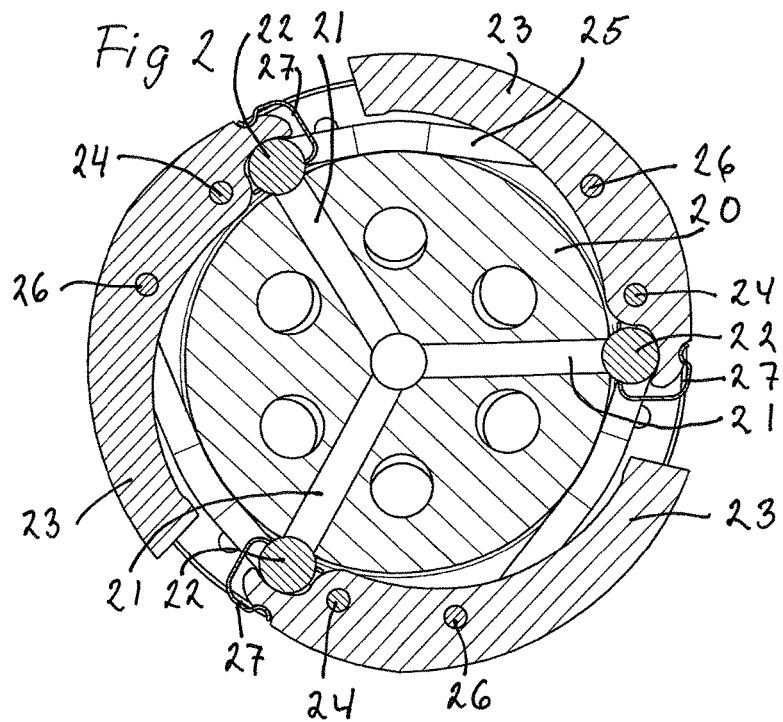
FIG. 2 is a cross section through a centrifugal regulator portion of a hydraulic pump assembly for that AWD coupling, relevant for the present invention.

FIGS. 1 and 2 stem from WO 2011/043722, to which reference is made for a full understanding of a hydraulic pump assembly, in which the present invention may be embodied. This hydraulic pump assembly is intended for use in an actuation system for a limited slip coupling for the distribution of torque for example in all wheel drive vehicles (AWD).

The hydraulic system shown in FIG. 1 includes an electric motor 1, driving a pump 2 via a drive shaft 3, which also drives a centrifugal regulator 4. The position of the centrifugal regulator 4 controls the position of and flow through a pressure overflow valve 5.

Hydraulic oil for the hydraulic actuator system is contained in a reservoir 6. It is sucked into the pump 2 through a hydraulic line 7 and is delivered therefrom towards a hydraulic cylinder 8 for actuating a disc package 9 of a limited slip coupling 10 by means of a piston 11 in the cylinder 8.

Depending on the position of the centrifugal regulator 4 and thus the pressure overflow valve 5, a portion and sometimes all of the hydraulic flow is diverted through a hydraulic line 12, through the overflow valve 5 and back to the reservoir 6. The result is that the hydraulic pressure delivered to the cylinder 8 is governed by the centrifugal regulator 4.

A relief valve 13 is connected to the cylinder 8 by means of a hydraulic line 14. The relief valve 13 has the purpose of diverting hydraulic oil from the cylinder 8 to the reservoir 6, when its pressure exceeds a certain level, for example 40 bar.

The electric motor 1, the pump 2, the drive shaft 3, the centrifugal regulator 4, and the overflow valve 5 are included in a hydraulic pump assembly. FIG. 2 is a cross section through members of the centrifugal regulator 4 and the overflow valve 5 in the hydraulic pump assembly.

Shown in FIG. 2 is a piston drum 20, being part of the pump 2 and rotated at operation. The rotation axis of the drum 20 defines the axial direction throughout the specification, and the direction perpendicular thereto is the radial direction. The piston drum 20 is provided with preferably three radial bores 21 for hydraulic oil. At the peripheral end of each bore 21 there is a valve member, preferably in the form of a ball 22.

For controlling the application of each ball 22 against the open end of its bore 21 and thus the hydraulic flow past the ball 22, there is a centrifugal lever 23. The lever 23 is relatively close to a first one of its ends pivotally attached to the piston drum 20 by means of a lever pin 24. At rotation of the piston drum 20 the other or second end of the lever 40 will be biased radially out from the piston drum 20 by the centrifugal force. This tendency is counteracted by a spring means in the form of a ring spring 25, laid around spring pins 26 on the levers 23. The ball 22 is preferably connected to the lever end by means of a spring clip 27, which will allow the ball 22 to fit sealingly in the bore end or mouth of the bore 21.

In FIG. 2 the levers 23 are shown swung out radially under the action of a centrifugal force, and the balls 22 are closing off the radial bores 21.

For further information about the design and function of the hydraulic pump assembly, reference is made to said WO 2011/043722.

As has been explained more in detail above, the main object of the invention is to improve the control of the dynamics of the centrifugal regulator, comprising in essence the levers 23 controlling the balls 22.

Figure 3:
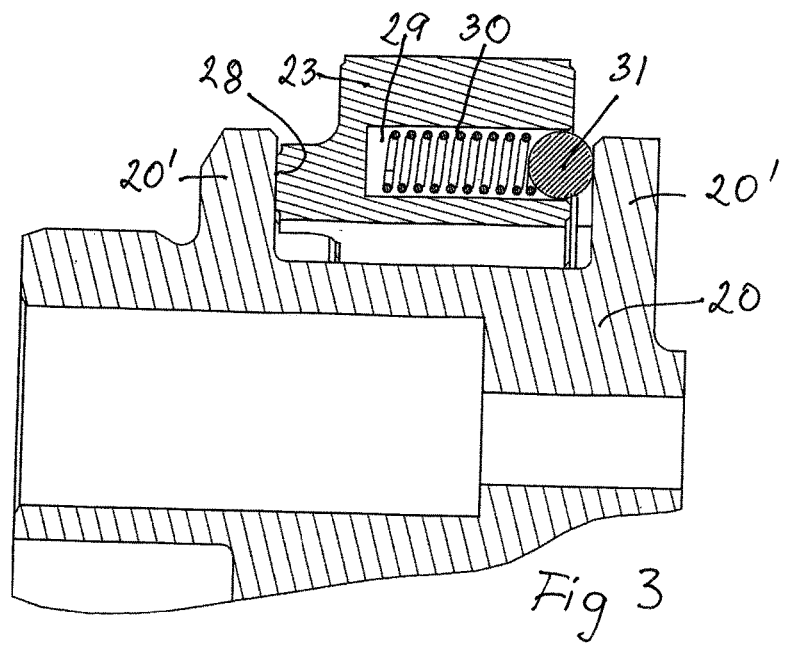
FIG. 3 is an axial section generally through the portion shown in FIG. 2 of a first embodiment of a device according to the invention.
Figure 4:
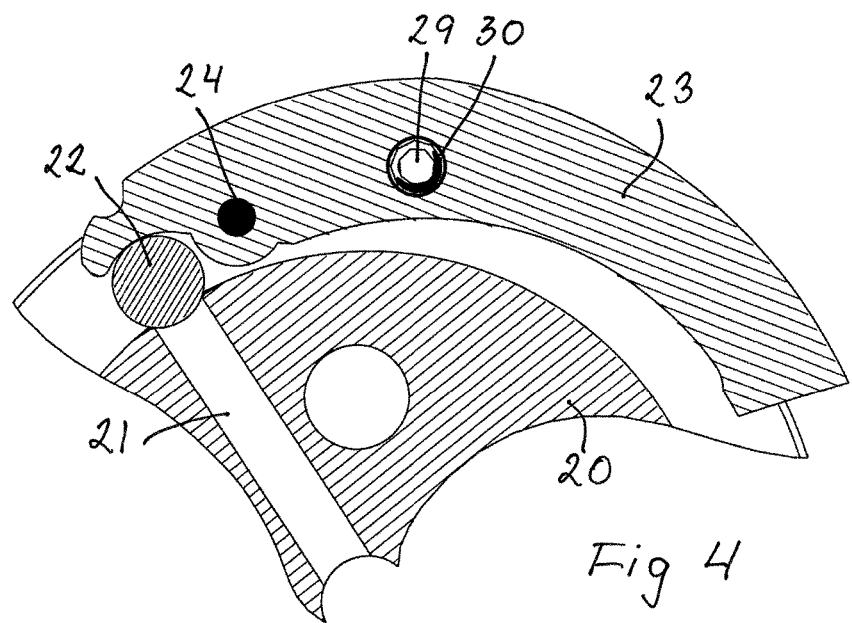
FIG. 4 is a radial section through the first embodiment according to FIG. 3.

A first embodiment of a device for such an improvement is shown in FIGS. 3 and 4. Shown therein are the piston drum 20, one ball 22, and one centrifugal lever 23 with its pivot pin 24. It also appears that the piston drum 20 is provided with radial guide flanges 20' at a slightly larger axial distance from each other than the width of the levers 23. These flanges 20' were basically intended to guide the levers 23 without interfering with their radial movements.

Now, according to the improvement, a certain control of the levers 23 in cooperation with the drum flanges 20' is introduced.

On one of its axial surfaces, namely its left hand surface in FIG. 3, the lever 24 is provided with a defined friction surface 28, preferably in the form of a small knob, for cooperation with the left hand flange 20'.

Generally opposite the friction surface, the lever 23 is provided with a bore 29, housing a compression spring 30 and a ball 31 contacting the right hand flange 20'. The spring and ball arrangement will create an axial force biasing the friction surface 28 into engagement with the left hand flange 20'. There will also be a minor friction between the ball 31 and the right hand flange 20'. The required axial force may be provided by any alternative spring arrangement, as will be apparent to any person skilled in the art.

Figure 5:
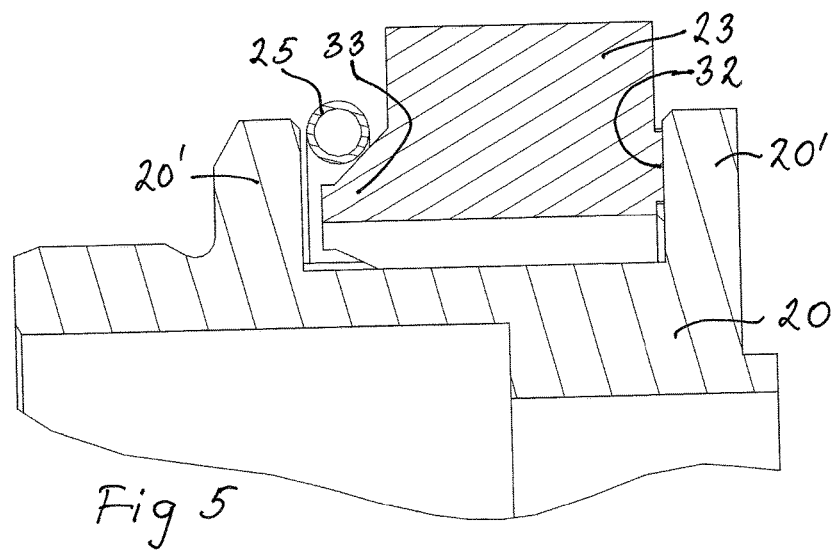
FIG. 5 is an axial section generally through the portion shown in FIG. 2 of a second embodiment of a device according to the invention.

A second embodiment of a device for the improvement mentioned above is shown in FIGS. 5-7. Shown in FIG. 5 are the piston drum 20 with its radial flanges 20' and the centrifugal lever 23. Also shown in FIG. 5 is the ring spring 25, mentioned above in connection with FIG. 2. Shown in FIG. 6 are the piston drum 20, the lever 23, the ring spring 25, as well as the pivot pin or lever pin 24.

Referring to FIG. 5, also in this case the lever 23 is provided with a defined friction surface 32 on one of its axial surfaces, namely its right hand surface. This friction surface 32 has preferably the form of a small knob for cooperation with the right hand flange 20'.

The ring spring 25, which was present in the prior art device shown in FIG. 2, is here utilized for also providing an axial force biasing the friction surface 28 into engagement with the right hand flange 20'. For this purpose the straight spring pin 26 on the lever 23 in FIG. 2 is replaced by a sloping pin 33 with a surface sloping downwards from the lever 23 towards the piston drum 20.

Figure 6:
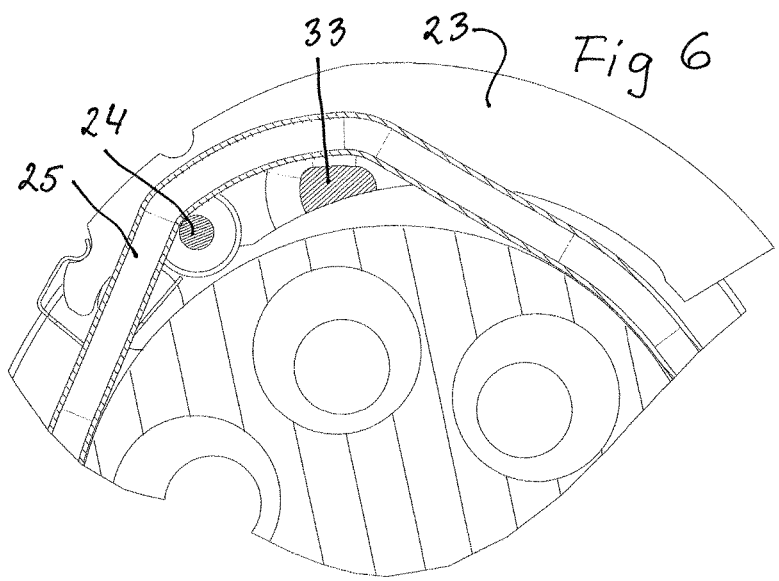
FIG. 6 is a radial section through the second embodiment according to FIG. 5.

As is most clearly shown in FIG. 6, the ring spring 25 is laid around the lever pin 24 as well as the sloping pin 33 on each lever 23.

In the known version according to FIG. 2, the spring ring 25 creates a radial force on the lever 23, but by the use of the sloping pin 33 also an axial force is created acting to bias the friction surface 32 into engagement with the right hand flange 20'. The axial force is created by the reaction force between the ring spring 25 and the piston drum 20 as a result of the sloping surface of the pin 33 initially biasing the ring spring 25 axially against the piston drum 20.

The lever 23 is shown in FIG. 7. Shown here are a lever bore 24' for the lever pin 24 and the sloping pin 33.

The invention is not limited to its use with a hydraulic pump assembly exactly as shown and described in the referenced publications.

Modifications are possible within the scope of the appended claims. The friction surfaces may for example be arranged on the flanges instead of on the levers.

The invention claimed is:

1. A hydraulic pump assembly, comprising a rotatable piston drum with at least one centrifugal lever pivotally attached thereto for radial movements between radial flanges under the action of centrifugal force at rotation of the piston drum, the centrifugal lever being arranged to control the position of a valve member, at the opening end of a bore in the piston drum, a defined friction surface between the lever and one of the radial flanges, and a spring means for resiliently applying an axial force acting on a surface located between the axial extents of the lever biasing the lever against said one of the radial flanges.

2. An assembly according to claim 1, wherein the friction surface is in the form of a protrusion on an axial side of the lever.

3. A hydraulic pump assembly, comprising a rotatable piston drum with at least one centrifugal lever pivotally attached thereto for radial movements between radial flanges under the action of centrifugal force at rotation of the piston drum, the centrifugal lever being arranged to control the position of a valve member, at the opening end of a bore in the piston drum, a defined friction surface between the lever and one of the radial flanges and by spring means for resiliently biasing the lever against said one of the flanges, wherein a compression spring placed in an axial bore in the lever is arranged to push a ball against the other radial flange.

4. An assembly according to claim 1, having a ring spring arranged around the piston drum and laid over an axial pin on the lever for controlling the radial movement of the lever, wherein the axial pin has a surface sloping downwards from the lever towards the piston drum.

* * * * *